US010628118B2

(12) United States Patent
Li et al.

(10) Patent No.: US 10,628,118 B2
(45) Date of Patent: Apr. 21, 2020

(54) SOUND EFFECT CONFIGURATION METHOD AND RELATED DEVICE

(71) Applicant: GUANGDONG OPPO MOBILE TELECOMMUNICATIONS CORP., LTD., Dongguan, Guangdong (CN)

(72) Inventors: Yajun Li, Dongguan (CN); Gaoting Gan, Dongguan (CN); Guang Tu, Dongguan (CN); Hai Yang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/081,090

(22) PCT Filed: Jun. 15, 2017

(86) PCT No.: PCT/CN2017/088426
§ 371 (c)(1),
(2) Date: Aug. 30, 2018

(87) PCT Pub. No.: WO2017/215629
PCT Pub. Date: Dec. 21, 2017

(65) Prior Publication Data
US 2019/0018643 A1 Jan. 17, 2019

(30) Foreign Application Priority Data
Jun. 16, 2016 (CN) .......................... 2016 1 0447251

(51) Int. Cl.
G06F 3/16 (2006.01)
H04R 3/04 (2006.01)
H04M 19/04 (2006.01)

(52) U.S. Cl.
CPC ................ *G06F 3/165* (2013.01); *G06F 3/16* (2013.01); *H04M 19/04* (2013.01); *H04R 3/04* (2013.01)

(58) Field of Classification Search
CPC . G06F 3/165; G06F 3/16; H04R 3/04; H04M 19/04
See application file for complete search history.

(56) References Cited

U.S. PATENT DOCUMENTS 8,706,919 B1    4/2014  Eisner
8,768,494 B1    7/2014  Stroud
(Continued)

FOREIGN PATENT DOCUMENTS

CN    101827163 A    9/2010
CN    101977260 A    2/2011
(Continued)

OTHER PUBLICATIONS

English translation of CN 101977260, 8 pages. (Year: 2011).*
(Continued)

*Primary Examiner* — Ping Lee

(57) ABSTRACT

A sound effect configuration method and a mobile terminal are provided. The method comprises: parameters of sound effect are loaded in a running memory of the mobile terminal; responsive to detection of a playing control instruction for an audio stream of a target application, it is determined whether the parameters of sound effect loaded in the running memory comprise a parameter of sound effect corresponding to the target application; responsive to determining that the parameters of sound effect loaded in the running memory comprise the parameter of sound effect corresponding to the target application, the parameter of sound effect corresponding to the target application is read from the running
(Continued)

memory; and the audio stream of the target application is configured by virtue of the parameter of sound effect.

18 Claims, 5 Drawing Sheets

(56) References Cited

U.S. PATENT DOCUMENTS

| | | | | |
|---|---|---|---|---|
| 2009/0204413 | A1* | 8/2009 | Sintes | G10L 19/16 704/500 |
| 2010/0228959 | A1 | 9/2010 | He | |
| 2011/0128147 | A1* | 6/2011 | Pan | G08B 21/22 340/539.13 |
| 2014/0031122 | A1* | 1/2014 | Peng | A63F 13/00 463/35 |

FOREIGN PATENT DOCUMENTS

| | | |
|---|---|---|
| CN | 102196077 A | 9/2011 |
| CN | 102375746 A | 3/2012 |
| CN | 103577306 A | 2/2014 |
| CN | 103617797 A | 3/2014 |
| CN | 103700381 A | 4/2014 |
| CN | 104090766 A | 10/2014 |
| CN | 104252342 A | 12/2014 |
| CN | 105262797 A | 1/2016 |
| CN | 106126176 A | 11/2016 |
| KR | 20100052749 A | 5/2010 |

OTHER PUBLICATIONS

International Search Report in international application No. PCT/CN2017/088426, dated Sep. 14, 2017.
The Written Opinion of the International Search Authority in international application No. PCT/CN2017/088426, dated Sep. 14, 2017.
Supplementary European Search Report in the European application No. 17812740.3, dated Jan. 28, 2019.

* cited by examiner

SOUND EFFECT CONFIGURATION METHOD AND RELATED DEVICE

CROSS-REFERENCE TO RELATED APPLICATION

This is a national phase application of PCT/CN2017/088426 filed on Jun. 15, 2017, claims priority to Chinese Patent Application No. 201610447251.3, filed on Jun. 16, 2016 and entitled "Sound effect configuration method and mobile terminal", the contents of which are incorporated by reference herein in its entirety.

TECHNICAL FIELD

The disclosure relates to the technical field of mobile terminals, and more particularly to a sound effect configuration method and a related device.

BACKGROUND

With the increasing popularization of mobile terminal communication products such as mobile phones; a mobile terminal gradually becomes an indispensable communication tool in people's lives. An audio data playing function of the mobile terminal becomes one of basic functions most commonly used by people.

In a present processing technology for sound effect of a mobile terminal, a manufacturer may usually configure a system sound effect mode according to a type of the mobile terminal to play audio streams of various types of applications in combination with a signal processing algorithm and an audio signal processing circuit. However, a parameter of sound effect corresponding to the system sound effect mode is loaded in real time when the mobile terminal plays an audio stream and more memory resources are occupied by the operation of loading an audio parameter, so that the mobile terminal only has fewer idle memory resources to execute an operation of playing the audio stream, which results in an insufficient memory. Therefore, an audio stream playing process is not so fluent, a non-fluency phenomenon easily appears, and a user experience is influenced.

BRIEF DESCRIPTION OF DRAWINGS

In order to describe the technical solutions in the embodiments of the disclosure or a conventional art more clearly, the drawings required to be used in descriptions about the embodiments or the conventional art will be simply introduced below. Obviously, the drawings in the following descriptions are only some embodiments of the disclosure. Other drawings may further be obtained by those of ordinary skilled in the art according to these drawings without creative work.

DETAILED DESCRIPTION

In order to make the solutions of the disclosure to be better understood by those skilled in the art, the technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those of ordinary skilled in the art on the basis of the embodiments in the disclosure without creative work shall fall within the scope of protection of the disclosure.

Terms "first", "second" and the like in the specification, claims and drawings of the disclosure are adopted to distinguish different objects, not to describe a specific sequence. In addition, terms "include" and "have" and any transformation thereof are intended to cover nonexclusive inclusions. For example, a process, method, system, product or a device including a series of operations or units is not limited to the operations or units which are listed, but may optionally further include operations or units which are not listed or optionally further include other operations or units inherent to the process, the method, the product or the device.

"Embodiment" mentioned in the disclosure means that a specific characteristic, structure or property described in combination with the embodiment may be included in at least one embodiment of the disclosure. Such a phrase at each position in the specification may not always refer to the same embodiment as well as an independent or alternative embodiment mutually exclusive with the other embodiments. It should be understood explicitly and implicitly by those skilled in the art that the embodiments described in the disclosure may be combined with the other embodiments.

In order to better understand a sound effect configuration method and a mobile terminal disclosed by the embodiments of the disclosure, the embodiments of the disclosure will be introduced below in detail.

Figure 1:
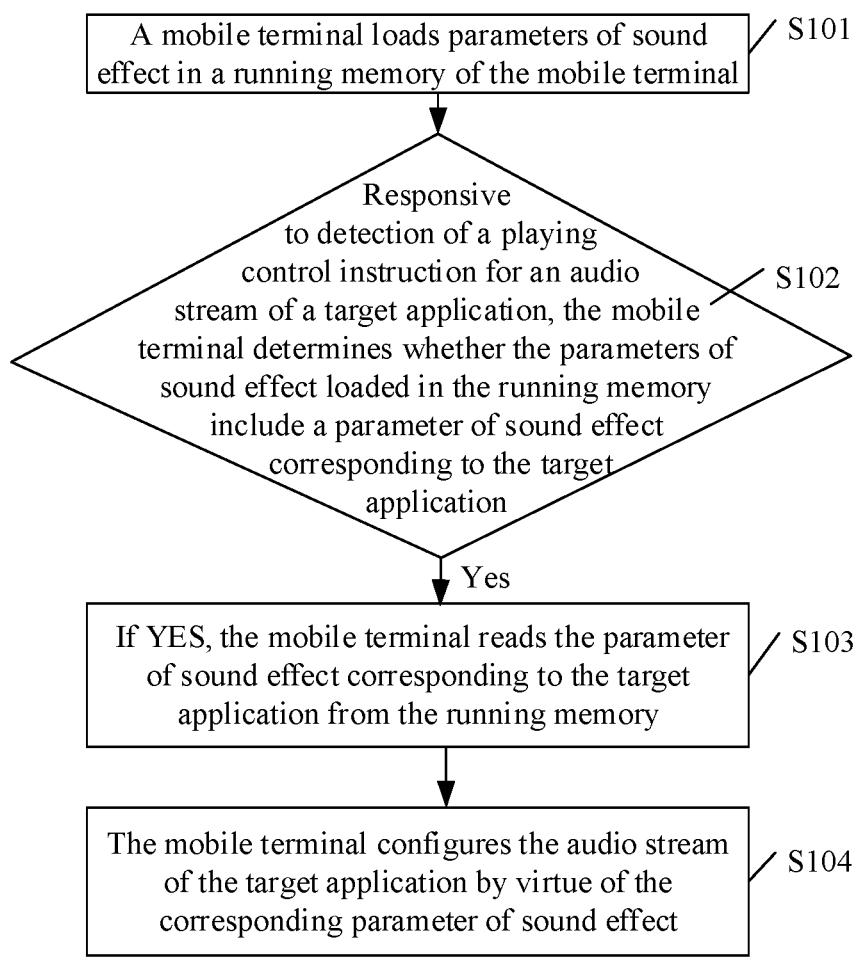
FIG. 1 is a flowchart of a sound effect configuration method according to an embodiment of the disclosure.

Referring to FIG. 1, FIG. 1 illustrates a sound effect configuration method according to an embodiment of the disclosure. As illustrated in FIG. 1, the sound effect configuration method includes the following operations.

In S101, a mobile terminal loads parameters of sound effect in a running memory of the mobile terminal.

In the example, a memory of the mobile terminal includes a running memory and a non-running memory, wherein the running memory refers to a memory for running applications of the mobile terminal and is also called as a Random Access Memory (RAM), and the non-running memory is a memory for storing data and is also called as a Read-Only Memory (ROM). For example, a ROM with a capacity of 8G is a non-running memory with an 8G storage space.

In the example, the parameters of sound effect specifically include at least one of: a Compress parameter, an Amp-Type parameter, an EQ_Bass parameter, an EQ_Mid parameter, an EQ_Treble parameter or a Noise_Gate parameter.

In S102, responsive to detection of a playing control instruction for an audio stream of a target application, the mobile terminal determines whether the parameters of sound effect loaded in the running memory include a parameter of sound effect corresponding to the target application.

In the example, the playing control instruction may be, for example, generated by the mobile terminal when a selection operation for the audio stream of the target application is detected.

The target application may be, for example, an audio and video player, a game application, a call application and the like.

The audio stream may be, for example, a prompt tone, a background sound, a song, a call voice and the like.

In S103, when determining that the parameters of sound effect loaded in the running memory include the parameter of sound effect corresponding to the target application, the mobile terminal reads the parameter of sound effect corresponding to the target application from the running memory.

In S104, the mobile terminal configures the audio stream of the target application by virtue of the corresponding parameter of sound effect.

It can be seen that, compared with a solution in the conventional art that the mobile terminal loads the parameters of sound effect only when the audio stream is played, the embodiment of the disclosure has the following advantages. The mobile terminal loads the parameters of sound effect in advance in the running memory, and when the playing control instruction for the audio stream of the target application is detected and the loaded parameters of sound effect include the parameter of sound effect corresponding to the target application, the mobile terminal reads the parameter of sound effect corresponding to the target application from the running memory and configures the audio stream of the target application by virtue of the corresponding parameter of sound effect. Memory resources of the mobile terminal is prevented from being occupied by an operation of loading a parameter of sound effect while the parameter of sound effect of the audio stream is configured, thereby improving a configuration speed for parameters of sound effect of the mobile terminal, optimizing memory resource management and improving the user experience.

In at least one embodiment, after the operation that the mobile terminal configures the audio stream of the target application by virtue of the corresponding parameter of sound effect, the following operation is further executed.

The mobile terminal plays the audio stream configured with the corresponding parameter of sound effect.

In at least one embodiment, before the operation that the mobile terminal determines whether the parameters of sound effect loaded in the running memory include the parameter of sound effect corresponding to the target application, the following operations are further executed.

The mobile terminal determines whether the mobile terminal prestores an application-level parameter of sound effect of the target application.

When determining that the mobile terminal prestores the application-level parameter of sound effect of the target application, the mobile terminal determines the application-level parameter of sound effect to be the parameter of sound effect corresponding to the target application.

When determining that the mobile terminal fails to prestore the application-level parameter of sound effect of the target application, the mobile terminal determines a global parameter of sound effect of the mobile terminal to be the parameter of sound effect corresponding to the target application.

In the example, the global parameter of sound effect is usually configured by a developer as a factory setting, or, may also be customized by a user in a subsequent using process. The application-level parameter of sound effect refers to a parameter of sound effect customized by the user and dedicated to play the audio stream of the target application. For example, a first application-level parameter of sound effect is configured for a music player of the mobile terminal, a second application-level parameter of sound effect is configured for a game application of the mobile terminal and the like.

It can be understood that the mobile terminal may load the parameters of sound effect in the running memory of the mobile terminal in various implementation manners and there are no unique limits made in the embodiment of the disclosure.

In an embodiment, an implementation manner in which the mobile terminal may load the parameters of sound effect in the running memory of the mobile terminal may be as follows.

Responsive to detecting that system time of the mobile terminal is in a preset idle period, the parameters of sound effect are loaded in the running memory of the mobile terminal. Specifically, the mobile terminal may acquire a prestored sound effect configuration file and load parameters of sound effect in the sound effect configuration file into the running memory of the mobile terminal. The sound effect configuration file at least includes the global parameter of sound effect of the mobile terminal and may further include application-level parameters of sound effect of some applications of the mobile terminal.

Furthermore, before the mobile terminal detects that the system time of the mobile terminal is in the preset idle period, the mobile terminal further executes the following operation.

It is determined a period in which a memory utilization rate of the mobile terminal is lower than a preset threshold value, and the period is determined to be the preset idle period of the mobile terminal. In the example, the memory utilization rate refers to an average memory utilization ratio of the mobile terminal in a preset period, the preset threshold value may be any preset value, for example, 10%, 15% and 20%, and the preset idle period may be, for example, 1:00 to 7:00 and 13:00 to 14:00. For example, memory utilization rates in different periods calculated by the mobile terminal are illustrated in the following table.

| Period | Memory utilization rate |
| --- | --- |
| 24:00 to 7:00 | 15% |
| 7:00 to 9:00 | 45% |
| 9:00 to 11:30 | 25% |
| 11:30 to 14:00 | 78% |
| 14:00 to 17:45 | 20% |
| 17:45 to 19:00 | 61% |
| 19:00 to 21:00 | 15% |
| 21:00 to 23:00 | 33% |
| 23:00 to 24:00 | 15% | if the preset threshold value is provided to be 30%, the mobile terminal determines that the preset idle period is a period set formed by the periods 7:00 to 9:00, 11:30 to 14:00, 17:45 to 19:00 and 21:00 to 23:00.

Alternatively, idle period configuration information is acquired, and a period in the idle period configuration information is determined to be the preset idle period of the mobile terminal. In the example, the idle period configuration information may be generated by the mobile terminal responsive to detection of a selection operation of the user for a target period in a drop-down period list displayed by the mobile terminal.

In the two preset idle period determination manners, the former is automatically implemented in a machine learning manner and may determine memory utilization rates in different historical periods more accurately after accumulation of the historical periods, which is accurate and convenient; and the latter allows the user to set the specific periods as preset idle periods, better reflects the subjective cognition of the user and is more applicable to some specific users. Adoption of another manner for achieving the technical purpose may not influence implementation of the embodiment of the disclosure, so that the examples listed above should not be understood as unique limits to the embodiment of the disclosure.

It can be seen that, in at least one embodiments, the mobile terminal is limited to load the parameters of sound effect in advance only in the preset idle period and the preset idle period is the period when the memory utilization rate of the mobile terminal is lower than the preset threshold value. Therefore, the mobile terminal may load the parameters of sound effect in advance only under the condition of sufficient memory resources, thereby avoiding a non-fluency phenomenon of a foreground application of the mobile terminal due to insufficient memory resources and improving application running fluency of the mobile terminal and the user experience.

In another embodiment, the implementation manner in which the mobile terminal loads the parameters of sound effect in the running memory of the mobile terminal may be as follows.

Responsive to detecting that remaining power of the mobile terminal is higher than a preset power threshold value, the parameters of sound effect are loaded in the running memory of the mobile terminal. Specifically, the mobile terminal may acquire the prestored sound effect configuration file and load the parameters of sound effect in the sound effect configuration file into the running memory of the mobile terminal. In the example, the sound effect configuration file at least includes the global parameter of sound effect of the mobile terminal and may further include the application-level parameters of sound effect of some applications of the mobile terminal.

In the example, the preset power threshold value may be any preset value, for example, 10%, 15% and 20%.

It can be seen that, in at least one embodiment, the mobile terminal is limited to load the parameters of sound effect in advance only under the condition of sufficient power, so that a continuous power consumption due to pre-loading of the parameters of sound effect under a low-power condition of the mobile terminal is avoided, which are favorable for prolonging service life of the mobile terminal under the low-power condition and saving power.

In another embodiment, the implementation manner in which the mobile terminal loads the parameters of sound effect in the running memory of the mobile terminal may be as follows.

Responsive to detecting that the mobile terminal is in a charging state, the parameters of sound effect are loaded in the running memory of the mobile terminal. Specifically, the mobile terminal may acquire the prestored sound effect configuration file and load the parameters of sound effect in the sound effect configuration file into the running memory of the mobile terminal, wherein the sound effect configuration file at least includes the global parameter of sound effect of the mobile terminal and may further include the application-level parameters of sound effect of some applications of the mobile terminal.

It can be seen that, in at least on embodiment, the mobile terminal is limited to load the parameters of sound effect in advance only in the charging state, so that the continuous power consumption of the mobile terminal due to pre-loading of the parameters of sound effect is avoided, which are favorable for improving power management efficiency of the mobile terminal and saving power.

Figure 2:
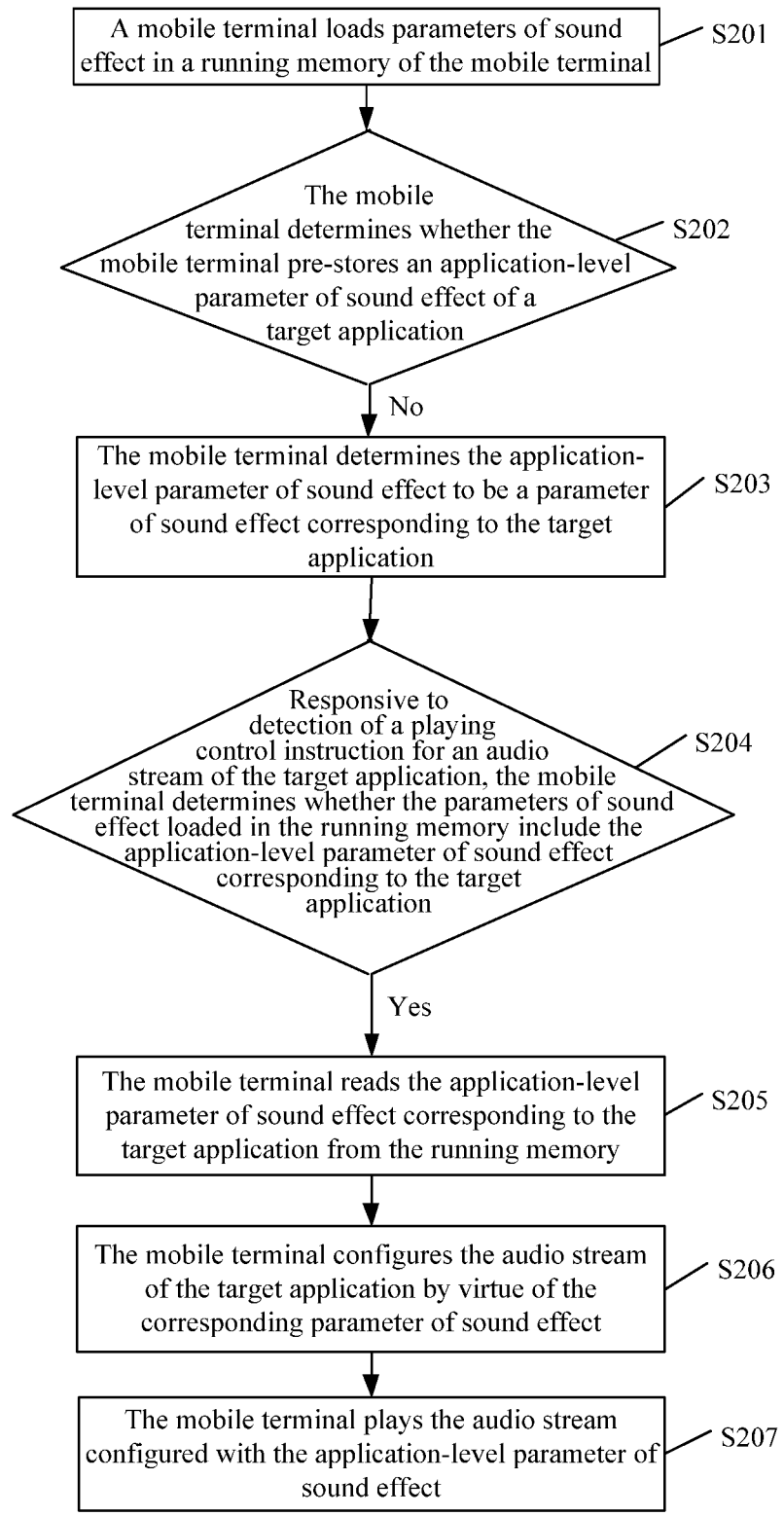
FIG. 2 is a flowchart of another sound effect configuration method according to an embodiment of the disclosure.

Referring to FIG. 2, FIG. 2 is a flowchart of another sound effect configuration method according to an embodiment of the disclosure, which is consistent with the embodiment illustrated in FIG. 1. As illustrated in FIG. 2, the sound effect configuration method includes the following operations.

In S201, a mobile terminal loads parameters of sound effect in a running memory of the mobile terminal.

In S202, the mobile terminal determines whether the mobile terminal prestores an application-level parameter of sound effect of a target application.

In S203, when determining that the mobile terminal prestores the application-level parameter of sound effect of the target application, the mobile terminal determines the application-level parameter of sound effect to be a parameter of sound effect corresponding to the target application.

In S204, responsive to detection of a playing control instruction for an audio stream of the target application, the mobile terminal determines whether the parameters of sound effect loaded in the running memory include the application-level parameter of sound effect corresponding to the target application.

In S205, when determining that the parameters of sound effect loaded in the running memory include the application-level parameter of sound effect corresponding to the target application, the mobile terminal reads the application-level parameter of sound effect corresponding to the target application from the running memory.

In S206, the mobile terminal configures the audio stream of the target application by virtue of the corresponding parameter of sound effect.

In S207, the mobile terminal plays the audio stream configured with the application-level parameter of sound effect.

It can be seen that, compared with a solution in the conventional art that the mobile terminal loads the parameter of sound effect only when the audio stream is played, the embodiment of the disclosure has the following advantages. The mobile terminal loads the parameters of sound effect in advance in the running memory, and when the playing control instruction for the audio stream of the target application is detected and the loaded parameters of sound effect include the parameter of sound effect corresponding to the target application, the mobile terminal reads the parameter of sound effect corresponding to the target application from the running memory and configures the audio stream of the target application by virtue of the corresponding parameter of sound effect. Memory resources of the mobile terminal is prevented from being occupied by an operation of loading a parameter of sound effect while the parameter of sound effect of the audio stream is configured, thereby improving a configuration speed for parameters of sound effect of the mobile terminal, optimizing memory resource management and improving the user experience.

Figure 3:
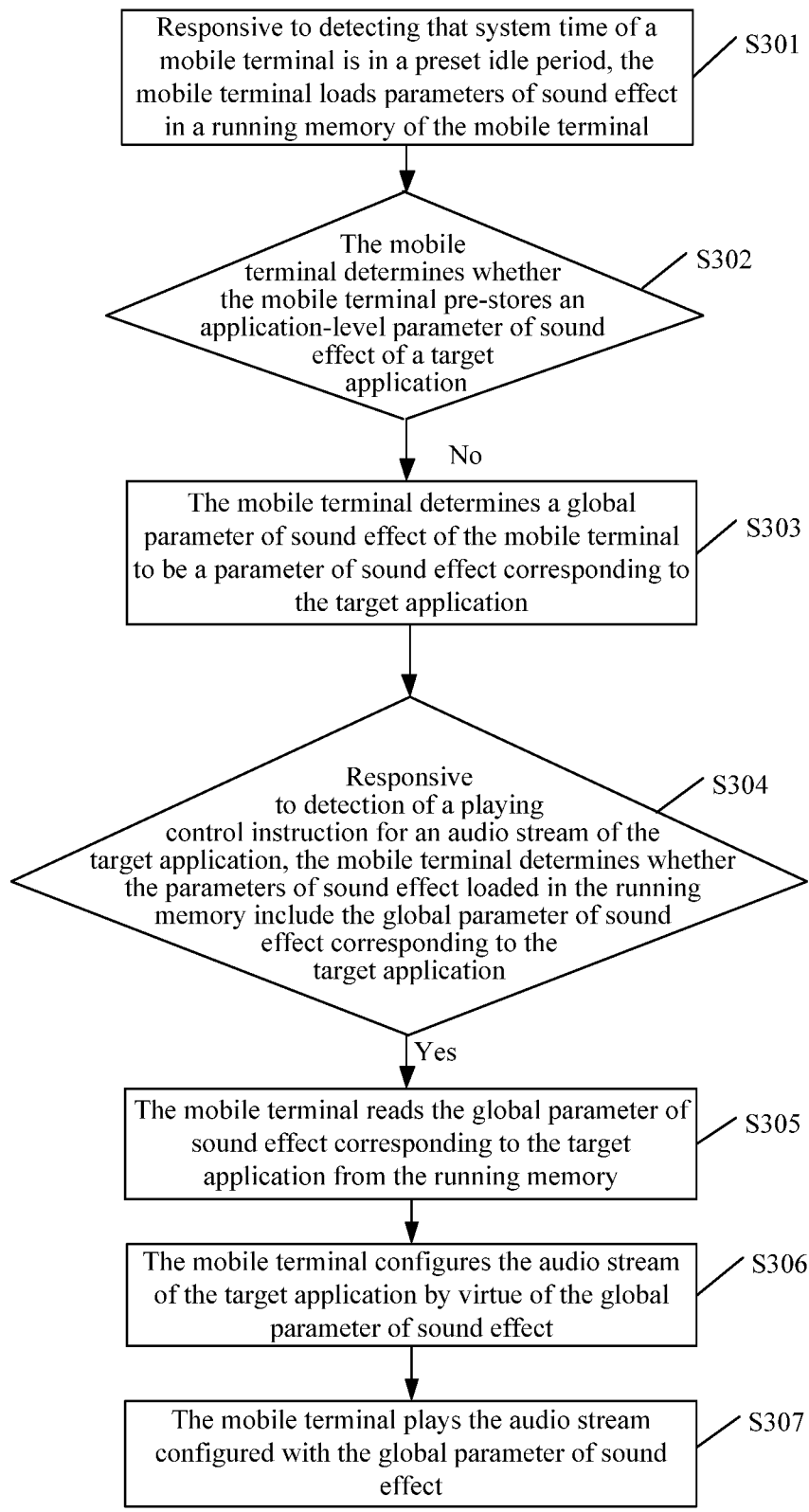
FIG. 3 is a flowchart of another sound effect configuration method according to an embodiment of the disclosure.

Referring to FIG. 3, FIG. 3 is a flowchart of another sound effect configuration method according to an embodiment of the disclosure, which is consistent with the embodiments illustrated in FIG. 1 and FIG. 2. As illustrated in FIG. 3, the sound effect configuration method includes the following operations.

In S301, responsive to detecting that system time of a mobile terminal is in a preset idle period, the mobile terminal loads parameters of sound effect in a running memory of the mobile terminal.

In S302, the mobile terminal determines whether the mobile terminal prestores an application-level parameter of sound effect of a target application.

In S303, when determining that the mobile terminal fails to prestore the application-level parameter of sound effect of the target application, the mobile terminal determines a global parameter of sound effect of the mobile terminal to be a parameter of sound effect corresponding to the target application.

In S304, responsive to detection of a playing control instruction for an audio stream of the target application, the mobile terminal determines whether the parameters of sound effect loaded in the running memory include the global parameter of sound effect corresponding to the target application.

In S305, when determining that the parameters of sound effect loaded in the running memory include the global parameter of sound effect corresponding to the target application, the mobile terminal reads the global parameter of sound effect corresponding to the target application from the running memory.

In S306, the mobile terminal configures the audio stream of the target application by virtue of the global parameter of sound effect.

In S307, the mobile terminal plays the audio stream configured with the global parameter of sound effect.

It can be seen that, compared with a solution in the conventional art that the mobile terminal loads the parameter of sound effect only when the audio stream is played, the embodiment of the disclosure has the following advantages. The mobile terminal loads the parameters of sound effect in advance in the running memory, and when the playing control instruction for the audio stream of the target application is detected and the loaded parameters of sound effect include the parameter of sound effect corresponding to the target application, the mobile terminal reads the parameter of sound effect corresponding to the target application from the running memory and configures the audio stream of the target application by virtue of the corresponding parameter of sound effect. Memory resources of the mobile terminal is prevented from being occupied by an operation of loading a parameter of sound effect while the parameter of sound effect of the audio stream is configured, thereby improving a configuration speed for parameters of sound effect of the mobile terminal, optimizing memory resource management and improving the user experience.

In addition, according to the embodiment of the disclosure, the mobile terminal is limited to load the parameters of sound effect in advance only in the preset idle period and the preset idle period is a period when a memory utilization rate of the mobile terminal is lower than a preset threshold value. Therefore, the mobile terminal may load the parameters of sound effect in advance only under the condition of sufficient memory resources, thereby avoiding a non-fluency phenomenon of a foreground application of the mobile terminal due to insufficient memory resources and improving application running fluency of the mobile terminal and the user experience.

Figure 4:
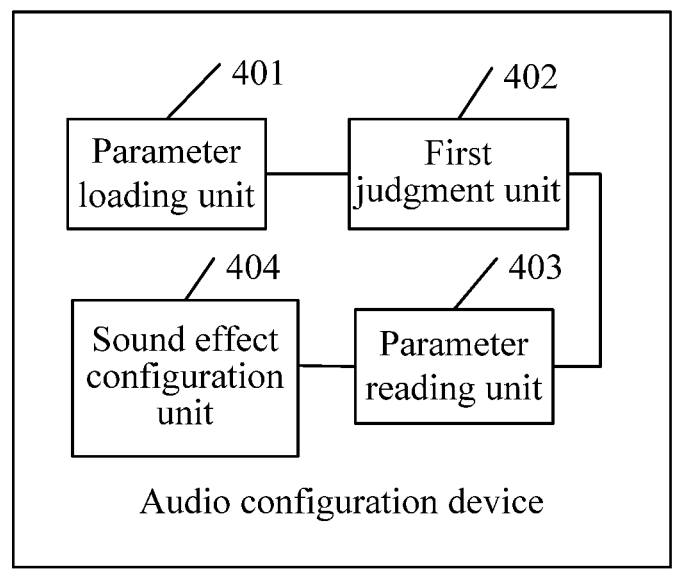
FIG. 4 is a composition block diagram of units of a sound effect configuration device according to an embodiment of the disclosure.

The below is a device embodiment of the disclosure. The device embodiment of the disclosure is used for executing the method in the method embodiment of the disclosure. As illustrated in FIG. 4, a mobile terminal may include a parameter loading unit 401, a first judgment unit 402, a parameter reading unit 403 and a sound effect configuration unit 404.

The parameter loading unit 401 is configured to load parameters of sound effect in a running memory of the mobile terminal.

The first judgment unit 402 is configured to, responsive to detection of a playing control instruction for an audio stream of a target application, determine whether the parameters of sound effect loaded in the running memory include a parameter of sound effect corresponding to the target application.

The parameter reading unit 403 is configured to, responsive to determining that the parameters of sound effect loaded in the running memory comprise the parameter of sound effect corresponding to the target application, read the parameter of sound effect corresponding to the target application from the running memory.

The sound effect configuration unit 404 is configured to configure the audio stream of the target application by virtue of the corresponding parameter of sound effect.

In at least one embodiment, the mobile terminal may further include the following units.

A second judgment unit, configured to, before the first judgment unit determines whether the parameters of sound effect loaded in the running memory include the parameter of sound effect corresponding to the target application, determine whether the mobile terminal prestores an application-level parameter of sound effect of the target application.

A first determination unit, configured to, responsive to determining that the mobile terminal prestores the application-level parameter of sound effect of the target application, determine the application-level parameter of sound effect to be the parameter of sound effect corresponding to the target application.

A second determination unit, configured to, responsive to determining that the mobile terminal fails to prestore the application-level parameter of sound effect of the target application, determine a global parameter of sound effect of the mobile terminal to be the parameter of sound effect corresponding to the target application.

In at least one embodiment, the parameter loading unit 401 may be configured to: responsive to detecting that system time of the mobile terminal is in a preset idle period, load the parameters of sound effect in the running memory of the mobile terminal.

In at least one embodiment, the preset idle period may comprise at least one of the following periods: a period when a memory utilization rate of the mobile terminal is lower than a preset threshold value or a period customized by a user.

In at least one embodiment, the parameter loading unit 401 may be configured to: responsive to detecting that the mobile terminal is under a preset condition, load the parameters of sound effect in the running memory of the mobile terminal, wherein the preset condition may comprise at least one of the following conditions: remaining power of the mobile terminal is higher than a preset power threshold value or the mobile terminal is in a charging state.

In at least one embodiment, the parameters of sound effect may include at least one of the following parameters: a Compress parameter, an Amp-Type parameter, an EQ_Bass parameter, an EQ_Mid parameter, an EQ_Treble parameter or a Noise_Gate parameter.

It is important to note that the mobile terminal described in the device embodiment of the disclosure is presented in form of functional units. Term "unit" used herein should be understood as a meaning which is as broad as possible and an object for realizing a described function of each "unit" may be, for example, an Application Specific Integrated Circuit (ASIC), a single circuit, a processor (shared, dedicated or chip unit) configured to execute one or more software or firmware programs and a memory, a combined logical circuit and/or other suitable components for realizing the above functions.

Figure 5:
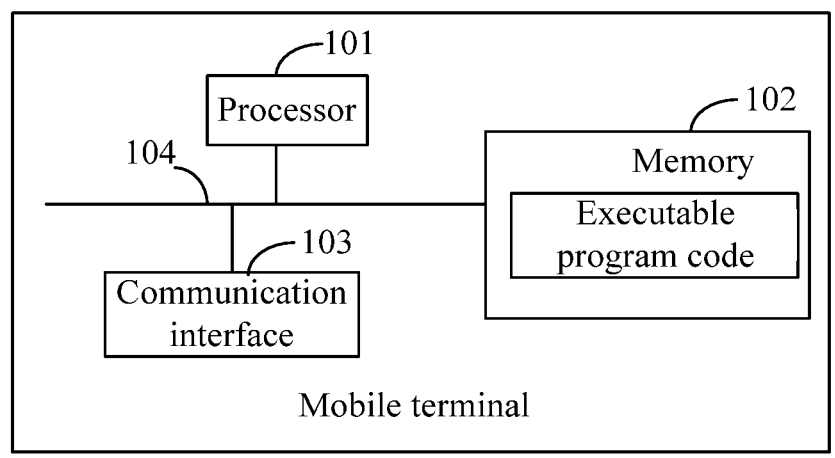
FIG. 5 is a schematic structure diagram of a mobile terminal according to an embodiment of the disclosure.

For example, the parameter of sound effect loading function of the parameter loading unit 401 may be realized by a mobile terminal illustrated in FIG. 5. Specifically, a processor 101 may call an executable program code in a memory 102 to load the parameters of sound effect in the running memory of the mobile terminal.

It can be seen that, compared with a solution in the conventional art that the mobile terminal loads the parameter of sound effect only when the audio stream is played, the embodiment of the disclosure has the following advantages. The mobile terminal loads the parameters of sound effect in advance in the running memory, and when the playing control instruction for the audio stream of the target application is detected and the loaded parameters of sound effect include the parameter of sound effect corresponding to the target application, reads the parameter of sound effect corresponding to the target application from the running memory and configures the audio stream of the target application by virtue of the corresponding parameter of sound effect. Memory resources of the mobile terminal is prevented from being occupied by an operation of loading a parameter of sound effect while the parameter of sound effect of the audio stream is configured, thereby improving a configuration speed for parameters of sound effect of the mobile terminal, optimizing memory resource management and improving the user experience.

An embodiment of the disclosure further provides another mobile terminal. As illustrated in FIG. 5, the mobile terminal includes: a processor 101, a memory 102, a communication interface 103 and a communication bus 104, wherein the processor 101, the memory 102 and the communication interface 103 are connected through the communication bus 104 and complete mutual communication with each other. The processor 101 controls wireless communication with an external cellular network through the communication interface 103. The communication interface 103 includes, but not limited to, an antenna, an amplifier, a transceiver, a coupler, a Low Noise Amplifier (LNA), a duplexer and the like. The memory 102 includes at least one of a RAM, a non-volatile memory and an external memory. An executable program code is stored in the memory 102, and the executable program code may direct the processor 101 to execute a sound effect configuration method specifically disclosed in the method embodiment of the disclosure, including the following operations.

The processor 101 loads parameters of sound effect in a running memory of the mobile terminal.

Responsive to detection of a playing control instruction for an audio stream of a target application, the processor 101 determines whether the parameters of sound effect loaded in the running memory include a parameter of sound effect corresponding to the target application.

Responsive to determining that the parameters of sound effect loaded in the running memory comprise the parameter of sound effect corresponding to the target application, the processor 101 reads the parameter of sound effect corresponding to the target application from the running memory.

The processor 101 configures the audio stream of the target application by virtue of the corresponding parameter of sound effect.

It can be seen that, compared with a solution in the conventional art that the mobile terminal loads the parameter of sound effect only when the audio stream is played, the embodiment of the disclosure has the following advantages: the mobile terminal loads the parameters of sound effect in advance in the running memory, and when the playing control instruction for the audio stream of the target application is detected and the loaded parameters of sound effect include the parameter of sound effect corresponding to the target application, the mobile terminal reads the parameter of sound effect corresponding to the target application from the running memory and configures the audio stream of the target application by virtue of the corresponding parameter of sound effect. Memory resources of the mobile terminal is prevented from being occupied by an operation of loading a parameter of sound effect while the parameter of sound effect of the audio stream is configured, thereby improving a configuration speed for parameters of sound effect of the mobile terminal, optimizing memory resource management and improving the user experience.

In addition, the executable program code stored in the memory 102 may further be configured to execute the related operations of the sound effect configuration methods illustrated in FIG. 1, FIG. 2 and FIG. 3, for example, executing the operation that the audio stream of the target application is configured by virtue of the corresponding parameter of sound effect.

Figure 6:
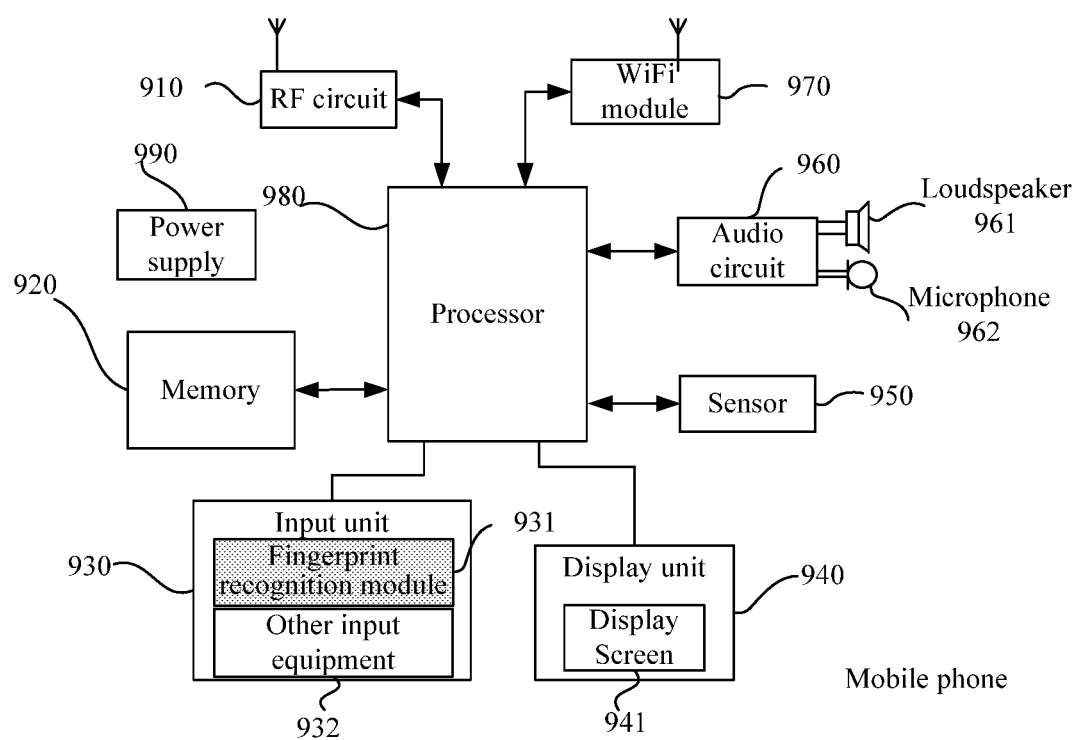
FIG. 6 is a schematic structure diagram of another mobile terminal according to an embodiment of the disclosure.

An embodiment of the disclosure further provides another mobile terminal. As illustrated in FIG. 6, for ease of description, only parts related to the embodiment of the disclosure are illustrated, and specific technical details which are undisclosed may refer to the method of the embodiments of the disclosure. The mobile terminal may be any terminal device including a mobile phone, a tablet computer, a Personal Digital Assistant (PDA), a Point of Sales (POS), a vehicle-mounted computer and the like. For example, the mobile terminal is a mobile phone.

FIG. 6 is a block diagram of a partial structure of a mobile phone related to a mobile terminal according to an embodiment of the disclosure. Referring to FIG. 6, the mobile phone includes components such as a Radio Frequency (RF) circuit 910, a memory 920, an input unit 930, a display unit 940, a sensor 950, an audio circuit 960, a Wireless Fidelity (WiFi) module 970, a processor 980 and a power supply 990. It should be understood by those skilled in the art that the structure of the mobile phone illustrated in FIG. 6 is not intended to limit the mobile phone, and may include components more or less than those illustrated in the figure or some components may be combined or different component arrangements may be adopted.

Each component of the mobile phone will be specifically introduced below in combination with FIG. 6.

The RF circuit 910 may be configured to receive and send information. The RF circuit 910 usually includes, but not limited to, an antenna, at least one amplifier, a transceiver, a coupler, an LNA, a duplexer and the like. In addition, the RF circuit 910 may also communicate with a network and other devices in a wireless communication manner. Any communication standard or protocol may be used for wireless communication, including, but not limited to, a Global System of Mobile communication (GSM), General Packet Radio Service (GPRS), Code Division Multiple Access (CDMA), Wideband Code Division Multiple Access (WCDMA), Long Term Evolution (LTE), an electronic mail, Short Messaging Service (SMS) and the like.

The memory 920 may be configured to store a software program and a module. The processor 980 operates the software program and the module stored in the memory 920 to execute various function applications and data processing of the mobile phone. The memory 920 may mainly include a program storage region and a data storage region, wherein the program storage region may store an operating system, an application program required by at least one function (for example, an audio parameter loading function and an audio stream playing function) and the like, and the data storage region may store data (for example, a global parameter of sound effect, an application-level parameter of sound effect and a sound effect configuration file) created according to use of the mobile phone and the like. In addition, the memory 920 may include a high-speed RAM, and may further include a non-volatile memory, for example, at least one disk storage device, flash memory device or other volatile solid-state storage device.

The input unit 930 may be configured to receive input digital or character information and generate key signal input related to user setting and function control of the mobile phone. Specifically, the input unit 930 may include a fingerprint recognition module 931 and other input device 932. The fingerprint recognition module 931 may collect fingerprint data of a user thereon. In at least one embodiment, the fingerprint recognition module 931 may include an optical fingerprint module, a capacitive fingerprint module and an RF fingerprint module. For example, when the fingerprint recognition module 931 is a capacitive fingerprint recognition module, the fingerprint recognition module specifically includes a sensing electrode (abnormity sensing electrode and normality sensing electrode) and a signal processing circuit (for example, an amplification circuit, a noise suppression circuit and an analogue-to-digital conversion circuit) connected with the sensing electrode. Besides the fingerprint recognition module 931, the input unit 930 may further include the other input device 932. Specifically, the other input device 932 may include, but not limited to, one or more of a physical keyboard, a function key (for example, a volume control key and an on-off key), a trackball, a mouse, a joystick and the like.

The display unit 940 may be configured to display information input by the user or information provided for the user and various menus of the mobile phone. The display unit 940 may include a display screen 941. In at least one embodiment, the display screen 941 may be configured in form of a Liquid Crystal Display (LCD), an Organic Light-Emitting Diode (OLED) and the like. Although the fingerprint recognition module 931 and display screen 941 in FIG. 6 are taken as two independent components to realize input and output functions of the mobile phone, the fingerprint recognition module 931 and the display screen 941 may be integrated to realize the input and output functions of the mobile phone in some embodiments.

The mobile phone may further include at least one sensor 950, for example, a light sensor, a motion sensor and another sensor. Specifically, the light sensor may include an environmental light sensor and a proximity sensor, wherein the environmental light sensor may regulate brightness of the display screen 941 according to brightness of environmental light, and the proximity sensor may turn off the display screen 941 and/or backlight when the mobile phone is moved to an ear. As a motion sensor, an accelerometer sensor may detect a magnitude of an acceleration in each direction (usually three axes), may detect a magnitude and direction of the gravity under a motionless condition, and may be configured for an application recognizing a posture of the mobile phone (for example, landscape and portrait switching, a related game and magnetometer posture calibration), a vibration recognition related function (for example, a pedometer and knocking) and the like. Other sensors which may be configured in the mobile phone, such as a gyroscope, a barometer, a hygrometer, a thermometer and an infrared sensor, will not be elaborated herein.

The audio circuit 960, a loudspeaker 961 and a microphone 962 may provide an audio interface between the user and the mobile phone. The audio circuit 960 may transmit an electric signal converted from received audio data to the loudspeaker 961, and then the loudspeaker 961 converts it into a sound signal for output. On the other aspect, the microphone 962 converts a collected sound signal into an electric signal, and then the audio circuit 960 receives the electric signal and converts it into audio data and outputs the audio data to the processor 980 for processing and sends to, for example, another mobile phone through the RF circuit 910 or outputs the audio data to the memory 920 for further processing.

WiFi is a short-distance wireless communication technology. The mobile phone may help the user to receive and send an electronic mail, browse a webpage, access streaming media and the like through the WiFi module 970, which provides wireless broadband Internet access for the user. Although the WiFi module 970 is illustrated in FIG. 6, it can be understood that it is not a necessary component of the mobile phone and may completely be omitted according to a requirement without changing the essence of the disclosure.

The processor 980 is a control center of the mobile phone, connects each part of the whole mobile phone by virtue of various interfaces and lines, and executes various functions and data processing of the mobile phone by operating or executing the software program and/or module stored in the memory 920 and calling data stored in the memory 920, thereby monitoring the whole mobile phone. In at least one embodiment, the processor 980 may include one or more processing units. Preferably, the processor 980 may integrate an application processor and a modem processor, wherein the application processor mainly processes the operating system, a user interface, an application program and the like, and the modem processor mainly processes wireless communication. It can be understood that the modem processor may also not be integrated into the processor 980.

The mobile phone further includes the power supply 990 (for example, a battery) supplying power to each component. Preferably, the power supply may be logically connected with the processor 980 through a power management system, thereby realizing functions of charging and discharging management, power consumption management and the like through the power management system.

Although being not illustrated in the figure, the mobile phone may further include a camera, a Bluetooth module and the like, which will not be elaborated herein.

In the embodiments illustrated in FIG. 1, FIG. 2 and FIG. 3, each operation of the method may be implemented on the basis of the structure of the mobile phone. In the embodiment illustrated in FIG. 4, the function of each unit may be realized on the basis of the structure of the mobile phone.

An embodiment of the disclosure further provides a computer storage medium, wherein the computer storage medium may store a program, and when the program is executed, part or all of the operations of any sound effect configuration method in the method embodiment are included.

It is important to note that, for simple description, each method embodiment is expressed into a combination of a series of actions. However, those skilled in the art should know that the disclosure is not limited by an action sequence described herein because some operations may be executed in another sequence or at the same time according to the disclosure. Second, those skilled in the art should also know that the embodiments described in the specification all belong to preferred embodiments and involved actions and modules are not always necessary to the disclosure.

Each embodiment in the abovementioned embodiments is described with different emphases, and undetailed parts in a certain embodiment may refer to related descriptions in the other embodiments.

In some embodiments provided by the application, it should be understood that the disclosed device may be implemented in another manner. For example, the device embodiment described above is only schematic, and for example, division of the units is only logical function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection, implemented through some interfaces, of the device or the units, and may be electrical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, functional units in each embodiment of the disclosure may be integrated into a processing unit, each unit may also physically exist independently, and two or more than two units may also be integrated into a unit. The integrated unit may be implemented in a hardware form and may also be implemented in form of software functional unit.

When being implemented in form of software functional unit and sold or used as an independent product, the integrated unit may be stored in a computer-readable memory. Based on such an understanding, the technical solutions of the disclosure substantially or parts making contributions to the conventional art or all or part of the technical solutions may be embodied in form of software product, and the computer software product is stored in a memory, including a plurality of instructions configured to enable a piece of computer equipment (which may be a personal computer, a server, network equipment or the like) to execute all or part of the operations of the method in each embodiment of the disclosure. The memory includes: various media capable of storing program codes such as a U disk, a ROM, a RAM, a mobile hard disk, a magnetic disk or an optical disk.

Those of ordinary skilled in the art can understand that all or part of the operations in various methods of the embodiments may be completed by related hardware instructed by a program. The program may be stored in a computer-readable memory, and the memory may include a flash disk, a ROM, a RAM, a magnetic disk, an optical disk or the like.

The embodiments of the disclosure are introduced above in detail, the principle and implementation modes of the disclosure are elaborated with specific examples in the disclosure, and the descriptions made to the embodiments are only adopted to help the method of the disclosure and the core concept thereof to be understood. In addition, those of ordinary skilled in the art may make variations to the specific implementation modes and the application scope according to the concept of the disclosure. From the above, the contents of the specification should not be understood as limits to the disclosure.

The invention claimed is:

1. A sound effect configuration method, comprising:
    acquiring idle period configuration information and determining that a period in the idle period configuration information is a preset idle period of a mobile terminal, wherein the idle period of the mobile terminal is generated by the mobile terminal responsive to detection of a selection operation of a user for a target period in a drop-down period list displayed by the mobile terminal;
    responsive to detecting that system time of the mobile terminal is in the preset idle period, loading parameters of sound effect in a running memory of the mobile terminal, wherein the system time is present time of the mobile terminal;
    responsive to detection of a playing control instruction for an audio stream of a target application, determining whether the parameters of sound effect loaded in the running memory comprise a parameter of sound effect corresponding to the target application;
    responsive to determining that the parameters of sound effect loaded in the running memory comprise the parameter of sound effect corresponding to the target application, reading the parameter of sound effect corresponding to the target application from the running memory; and
    configuring the audio stream of the target application by virtue of the parameter of sound effect.

2. The method according to claim 1, before determining whether the parameters of sound effect loaded in the running memory comprise the parameter of sound effect corresponding to the target application, further comprising:
    determining whether the mobile terminal prestores an application-level parameter of sound effect of the target application;
    responsive to determining that the mobile terminal prestores the application-level parameter of sound effect of the target application, determining the application-level parameter of sound effect to be the parameter of sound effect corresponding to the target application; and
    responsive to determining that the mobile terminal fails to prestore the application-level parameter of sound effect of the target application, determining a global parameter of sound effect of the mobile terminal to be the parameter of sound effect corresponding to the target application.

3. The method according to claim 1, wherein the preset idle period comprises at least one of: a period when a memory utilization rate of the mobile terminal is lower than a preset threshold value or a period customized by the user.

4. The method according to claim 1, wherein loading the parameters of sound effect in the running memory of the mobile terminal comprises:
    responsive to detecting that the mobile terminal is under a preset condition, loading the parameters of sound effect in the running memory of the mobile terminal, wherein the preset condition comprises at least one of: remaining power of the mobile terminal being higher than a preset power threshold value or the mobile terminal being in a charging state.

5. The method according to claim 1, wherein the parameters of sound effect comprise at least one of the following parameters:
   a Compress parameter, an Amp-Type parameter, an EQ_Bass parameter, an EQ_Mid parameter, an EQ_Treble parameter or a Noise_Gate parameter.

6. The method according to claim 5, after configuring the audio stream of the target application by virtue of the parameter of sound effect, further comprising:
   playing the audio stream configured with the parameter of sound effect.

7. The method according to claim 6, wherein the playing control instruction is generated by the mobile terminal under a condition of detecting a selection operation for the audio stream of the target application.

8. The method according to claim 7, wherein the target application comprises an audio and video player, a game application or a call application, and the audio stream comprises a prompt tone, a background sound, a song or a call voice.

9. A mobile terminal, comprising: a memory and a processor, the memory storing one or more computer programs that, when executed by the processor, cause the processor to execute operations comprising:
   acquiring idle period configuration information and determining that a period in the idle period configuration information is a preset idle period of the mobile terminal, wherein the idle period of the mobile terminal is generated by the mobile terminal responsive to detection of a selection operation of a user for a target period in a drop-down period list displayed by the mobile terminal;
   responsive to detecting that system time of the mobile terminal is in the preset idle period, loading parameters of sound effect in a running memory of the mobile terminal, wherein the system time is present time of the mobile terminal;
   responsive to detection of a playing control instruction for an audio stream of a target application, determining whether the parameters of sound effect loaded in the running memory comprise a parameter of sound effect corresponding to the target application;
   responsive to determining that the parameters of sound effect loaded in the running memory comprise the parameter of sound effect corresponding to the target application, reading the parameter of sound effect corresponding to the target application from the running memory; and
   configuring the audio stream of the target application by virtue of the parameter of sound effect.

10. The mobile terminal according to claim 9, wherein the operations further comprise:
    before determining whether the parameters of sound effect loaded in the running memory comprise the parameter of sound effect corresponding to the target application, determining whether the mobile terminal prestores an application-level parameter of sound effect of the target application;
    responsive to determining that the mobile terminal prestores the application-level parameter of sound effect of the target application, determining the application-level parameter of sound effect to be the parameter of sound effect corresponding to the target application; and
    responsive to determining that the mobile terminal fails to prestore the application-level parameter of sound effect of the target application, determining a global parameter of sound effect of the mobile terminal to be the parameter of sound effect corresponding to the target application.

11. The mobile terminal according to claim 10, wherein the preset idle period comprises at least one of: a period when a memory utilization rate of the mobile terminal is lower than a preset threshold value or a period customized by the user.

12. The mobile terminal according to claim 10, wherein the operations further comprise:
    responsive to detecting that the mobile terminal is under a preset condition, loading the parameters of sound effect in the running memory of the mobile terminal, wherein the preset condition comprises at least one of: remaining power of the mobile terminal being higher than a preset power threshold value or the mobile terminal being in a charging state.

13. The mobile terminal according to claim 9, wherein the operations further comprise:
    responsive to detecting that the mobile terminal is under a preset condition, loading the parameters of sound effect in the running memory of the mobile terminal, wherein the preset condition comprises at least one of: remaining power of the mobile terminal being higher than a preset power threshold value or the mobile terminal being in a charging state.

14. The mobile terminal according to claim 9, wherein the parameters of sound effect comprise at least one of the following parameters:
    a Compress parameter, an Amp-Type parameter, an EQ_Bass parameter, an EQ_Mid parameter, an EQ_Treble parameter or a Noise_Gate parameter.

15. The mobile terminal according to claim 14, wherein the operations further comprise:
    after configuring the audio stream of the target application by virtue of the parameter of sound effect, playing the audio stream configured with the parameter of sound effect.

16. The mobile terminal according to claim 15, wherein the playing control instruction is generated by the mobile terminal under a condition of detecting a selection operation for the audio stream of the target application.

17. The mobile terminal according to claim 16, wherein the target application comprises an audio and video player, a game application or a call application, and the audio stream comprises a prompt tone, a background sound, a song or a call voice.

18. A non-transitory computer storage medium, having stored a program, wherein the program, when being executed by a processor, causes the processor to perform a sound effect configuration method, the method comprising:
    acquiring idle period configuration information and determining that a period in the idle period configuration information is a preset idle period of a mobile terminal, wherein the idle period of the mobile terminal is generated by the mobile terminal responsive to detection of a selection operation of a user for a target period in a drop-down period list displayed by the mobile terminal;
    responsive to detecting that system time of the mobile terminal is in the preset idle period, loading parameters of sound effect in a running memory of the mobile terminal, wherein the system time is present time of the mobile terminal;

responsive to detection of a playing control instruction for an audio stream of a target application, determining whether the parameters of sound effect loaded in the running memory comprise a parameter of sound effect corresponding to the target application;

responsive to determining that the parameters of sound effect loaded in the running memory comprise the parameter of sound effect corresponding to the target application, reading the parameter of sound effect corresponding to the target application from the running memory; and configuring the audio stream of the target application by virtue of the parameter of sound effect.

* * * * *